US005353075A

United States Patent [19]
Conner et al.

[11] Patent Number: 5,353,075
[45] Date of Patent: Oct. 4, 1994

[54] CONVERTIBLE FLAT PANEL DISPLAY SYSTEM

[75] Inventors: Arlie R. Conner, Tualatin; Jonathon R. Biles, Portland; Paul E. Gulick, Tualatin, all of Oreg.

[73] Assignee: In Focus Systems, Inc., Tualatin, Oreg.

[21] Appl. No.: 128,890

[22] Filed: Sep. 29, 1993

Related U.S. Application Data

[60] Continuation-in-part of Ser. No. 1,055, Jan. 6, 1993, and Ser. No. 701,411, May 15, 1991, abandoned, which is a division of Ser. No. 233,285, Aug. 17, 1988, Pat. No. 5,101,197.

[51] Int. Cl.$^5$ .............................................. G03B 21/56
[52] U.S. Cl. ............................... 353/122; 353/DIG. 5; 364/231.1
[58] Field of Search ............... 353/122, 119, DIG. 3, 353/DIG. 5; 358/254; 364/708.1, 231.1, 231, 231.2, 231.3; 348/836, 838

[56] References Cited

U.S. PATENT DOCUMENTS

| | | | |
|---|---|---|---|
| 4,917,465 | 4/1990 | Conner et al. | 350/335 |
| 4,950,072 | 8/1990 | Hondae | 353/DIG. 5 |
| 5,041,965 | 8/1991 | Chen | 364/200 |
| 5,050,946 | 9/1991 | Hathaway et al. | 385/33 |
| 5,052,078 | 10/1991 | Hosoi | 358/254 |
| 5,091,873 | 4/1992 | Araki | 364/708.1 |
| 5,101,197 | 3/1992 | Hix et al. | 340/784 |
| 5,168,294 | 12/1992 | Davis et al. | 353/122 |
| 5,175,672 | 12/1992 | Conner et al. | 364/708.1 |
| 5,264,992 | 11/1993 | Hogdahl et al. | 364/708.1 |

OTHER PUBLICATIONS

LaPolla, Stephanie, et al., "Notebooks Linked to Mobile Presentation," PC Week, Sep. 6, 1993, pp. 29 and 33.

*Primary Examiner*—William A. Cuchlinski Jr.
*Attorney, Agent, or Firm*—Stoel Rives Boley Jones & Grey

[57] ABSTRACT

A flat panel display that is convertible between direct and projection display applications is incorporated in an information processing device of a unitary construction. In preferred embodiment, the information processing device is selectively configurable as a laptop-style personal computer and a projection display panel. The device includes a base section that contains computer circuitry, supports data input keys, and is pivotally coupled to a display panel section having an addressable flat panel display and an opaque backing member in opposed face-to-face relation thereto. The display panel section is selectively positionable between a first position in which the flat panel display is directly observable by a user, a second position in which the backing member covers the flat panel display and the data input keys for storage purposes, and a third position in which the display panel section is generally nonoverlapping and co-planar with the base section.

37 Claims, 6 Drawing Sheets

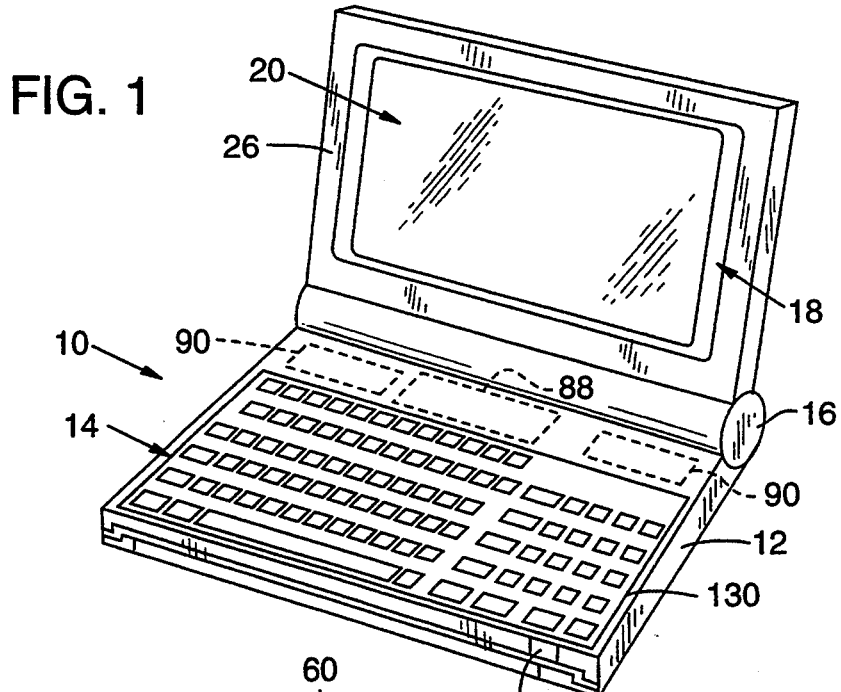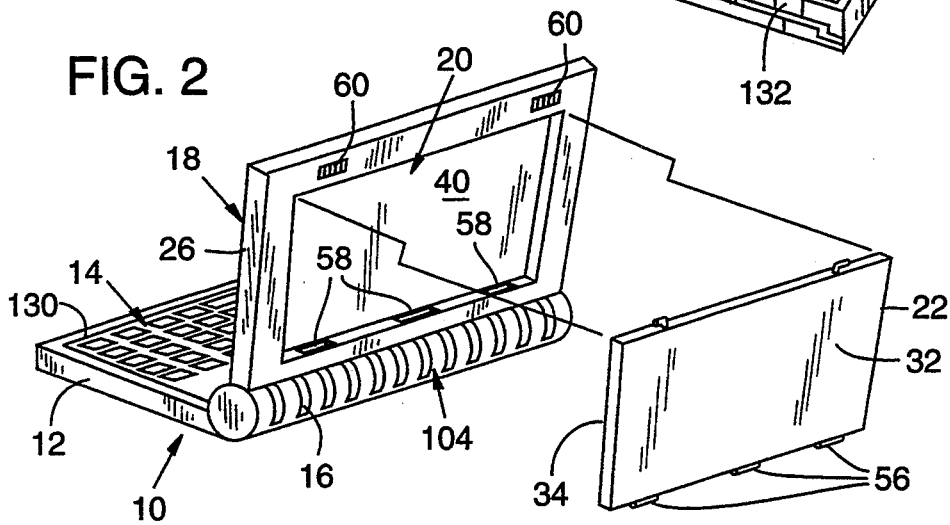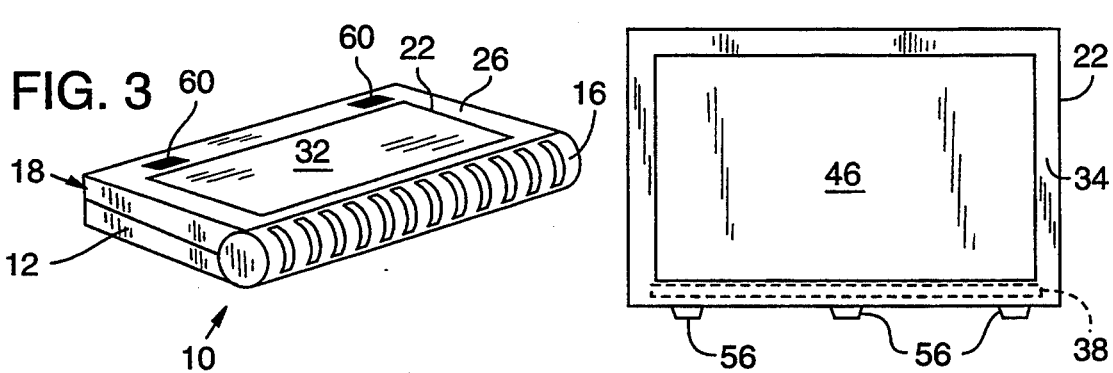

CONVERTIBLE FLAT PANEL DISPLAY SYSTEM

RELATED APPLICATIONS

This application is a continuation-in-part of copending application Ser. No. 08/001,055, filed Jan. 6, 1993, and a continuation-in-part of copending application Ser. No. 07/701,411, filed May 15, 1991, and now abandoned, which is a divisional of application Ser. No. 07/233,285, filed Aug. 17, 1988, now U.S. Pat. No. 5,101,197, all assigned to the assignee of the present application.

TECHNICAL FIELD

The present Invention relates to flat panel display systems for displaying computer-generated and other video information and, in particular, to a flat panel display system that is convertible between direct and projection viewing configurations.

BACKGROUND OF THE INVENTION

Flat display panels such as, for example, liquid crystal display panels, are commonly used to display computer-generated and other video information. Flat display panels are frequently used in direct-view applications, such as in laptop-style personal computers. Flat display panels are also used in projection display applications, such as an overhead projection display panel that operates with a conventional overhead projector light source. An example of such a projection display panel is described in U.S. Pat. No. 5,101,197 of Hix et al., assigned to the assignee of the present application.

Projection display panels are typically coupled to a personal computer (e.g., a laptop-style personal computer) that provides graphic information to be projected for viewing by more than one person. Despite the generally portable configurations of many projection display panels and laptop-style personal computers, it can sometimes be inconvenient for an individual to transport and operate such equipment simultaneously.

More specifically, many projection display panels include a substantially rigid annular case that supports a liquid crystal device by its side margins. The annular case contains electronics that control the liquid crystal device and supports a control panel by which an operator controls various display characteristics of the display panel such as, for example, color, contrast, cursor position, or switching between different display images.

The annular case is typically of a fixed, relatively large size with a length and a width that are greater than the corresponding 10 inch (25 cm) length and width of an overhead projector light-emitting platen. The relatively large size of the annular case allows it to perform three functions: support the liquid crystal device over the overhead projector platen, encase the electronics that control the liquid crystal device, and occlude light emitted from portions of overhead projector platen not aligned with the liquid crystal device. The occlusion function allows the projection display panel to form computer-generated and other video display images on a projection screen without distracting extraneous boundaries of unused light.

SUMMARY OF THE INVENTION

An object of the present invention is, therefore, to provide a flat panel display that is convertible between direct and projection display applications.

Another object of this invention is to provide such a display that is useable in connection with laptop-style personal computers and projection display panels.

A further object of this invention is to provide such a display that allows convenient use and transport of laptop-style personal computers and projection display panels.

The present invention includes a flat panel display that is convertible between direct and projection display configurations as implemented in, for example, laptop-style personal computers and projection display panels. In a preferred embodiment, the flat panel display of the present invention is incorporated in an information processing device of unitary configuration, such as a laptop-style personal computer.

The information processing device includes a base section that contains computer circuitry, supports data input keys, and is pivotally coupled to a display panel section having an addressable flat panel display and an opaque backing member in opposed face-to-face relation. The display panel section is selectively positionable between a first position in which the flat panel display is directly observable by a user, a second position in which the backing member covers the flat panel display and the data input keys for storage purposes, and a third position in which the display panel section is generally nonoverlapping and co-planar with the base section.

The information processing device further includes a user-operable fastener between the backing member and the display panel section so that the backing member is removable from the display panel section to allow transmissive observation of the flat panel display. As a result, the flat panel display allows the information processing device to be selectively configured as a laptop-style personal computer or a projection display panel.

Additional objects and advantages of the present invention will be apparent from the detailed description of preferred embodiments thereof, which proceeds with reference to the accompanying drawings.

BRIEF DESCRIPTION OF THE DRAWINGS

FIG. 1 is an isometric diagram of an information processing device of the present invention configured for use as a laptop-style personal computer.

FIG. 2 is an exploded isometric back view of the information processing device of FIG. 1.

FIG. 3 is an isometric diagram of the information processing device of FIG. 1 configured to be stored or transported.

FIG. 7 is a diagrammatic front view of a backing member shown removed from the panel display section of the information processing device of FIG. 1.

DETAILED DESCRIPTION OF PREFERRED EMBODIMENTS

Figure 4A:
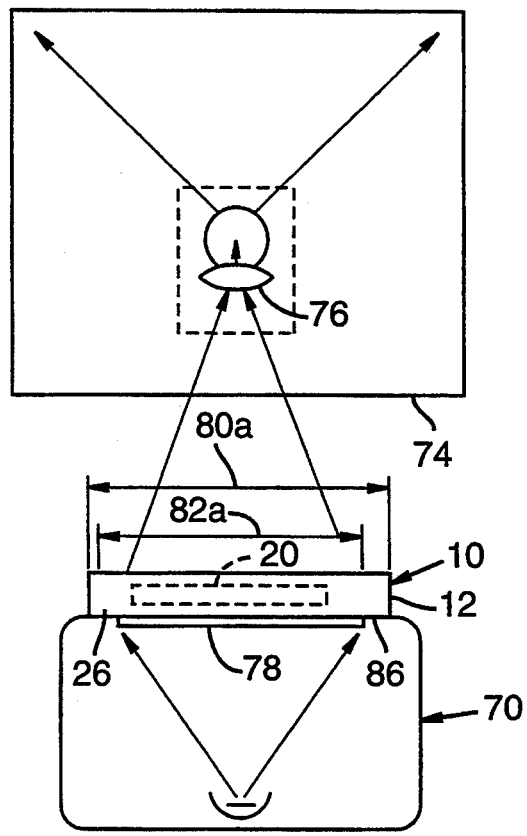
FIGS. 4A and 4B are diagrammatic front and side views, respectively, of the information processing device of FIG. 1 configured for use as a projection display panel with a conventional overhead projector.

FIGS. 1 and 2 show a unitary information processing device 10 of the present invention configured for use as a laptop-style personal computer. Information processing device 10 includes a base section 12 that contains computer circuitry (not shown) and supports data input keys 14 and a pivotal coupling 16 to a display panel section 18. The computer circuitry includes nonvolatile memory that stores programming for selectively operating information processing device 10 as a personal computer or a projection display panel.

Display panel section 18 includes a transmissive, addressable flat panel display 20 and a removable, opaque backing member 22 positioned in opposed face-to-face relation. Flat panel display 20 can include an active or a passive liquid crystal display, an electrophoretic display, or an electrochromic display. Preferably, flat panel display 20 includes a liquid crystal display of the supertwisted nematic type such as, for example, a liquid crystal device of the type described in U.S. Pat. No. 4,917,465 of Conner et al., assigned to the assignee of the present application. When it includes a liquid crystal display, flat panel display 20 selectively activates pixels to attenuate light according to display data generated by or retrieved from memory included in the computer circuitry.

Figure 11:
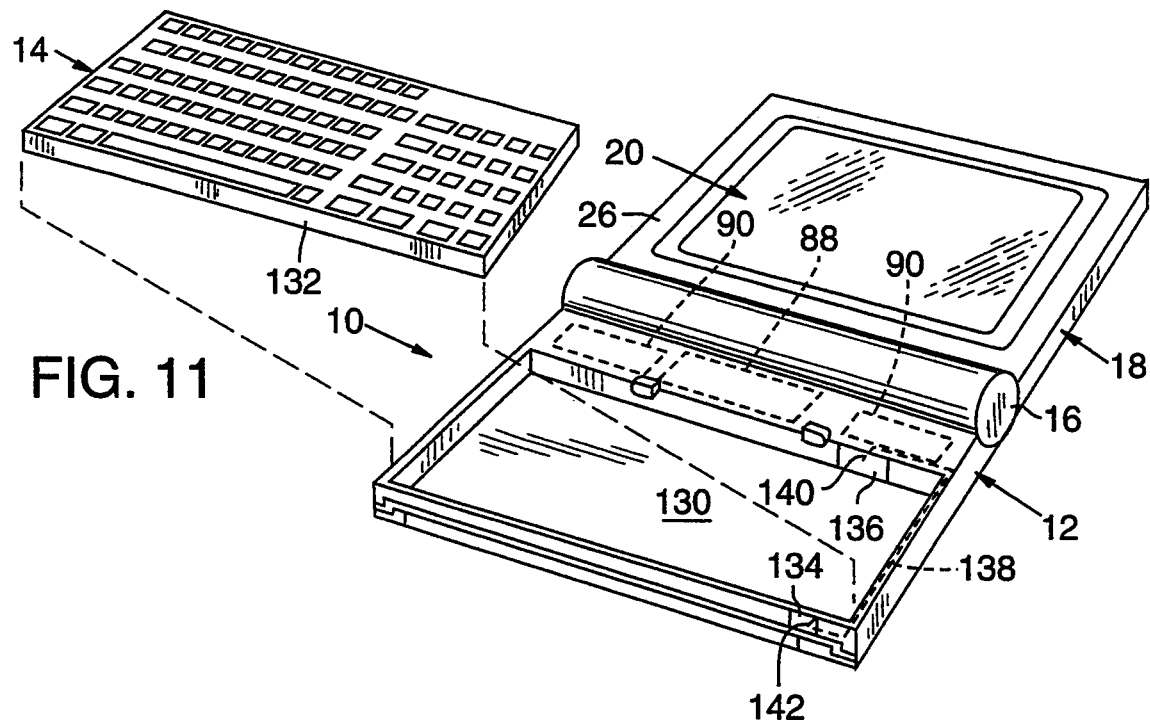
FIG. 11 is an isometric diagram of the information processing device of FIG. 1 configured for use as a projection display panel with a remote control unit.

Display panel section 18 is selectively positionable between first, second and third positions shown in FIGS. 1, 3, and 11, respectively. In the first position shown in FIG. 1, information processing device 10 is configured for use as a laptop-style personal computer in which flat panel display 20 is directly observable by a user. In the second position shown in FIG. 3, display panel section 18 is positioned directly over base section 12 such that backing member 22 covers the flat panel display 20 and the data input keys 16 for storage or transport purposes. In the third position shown in FIGS. 4B and 11, display panel section 18 is generally nonoverlapping and co-planar with base section 12. With backing member 22 removed and display panel section 18 in the third position, information processing device 10 is configured for use as a projection display panel operable with an overhead projector.

Display panel section 18 includes an annular case element 26 that supports flat panel display 20 by its side margins. Backing member 22 includes an opaque, rigid case backing 32 and an inner face 34 positioned in face-to-face relation to each other. Inner face 34 cooperates with flat panel display 20 to allow direct viewing by a user.

Figure 5:
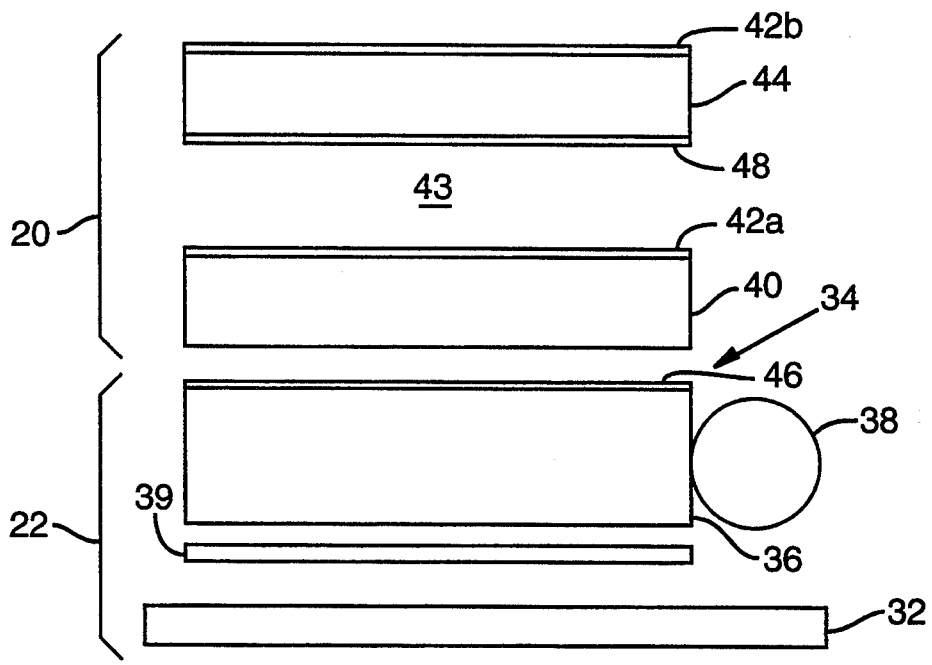
FIG. 5 is a diagrammatic side view of optical components in a first preferred flat panel display incorporated in the information processing device of FIG. 1.

FIG. 5 is a diagrammatic side view of first preferred optical components in flat panel display 20 and backing member 22. Inner face 34 of backing member 22 includes a translucent acrylic panel 36 with an associated fluorescent light source 38 positioned along one edge. Translucent panel 36 and light source 38 may be acquired as a backlight unit Model No. TB2607A from Hitachi of Tokyo, Japan. A white reflective coating or sheet 39 is positioned between case backing 32 and acrylic panel 36 to improve illumination of flat panel display 20 by light source 38. Adhesive aluminum mylar tape (not shown) is applied to outer edges of light source 38 and panel 36 reflect inward light at the edges, thereby to reduce loss of light.

Flat panel display 20 includes a glass back plate 40 that supports a first polarizer film 42a separated by a space 43 from a liquid crystal display 44 and a second polarizer 42b fixed thereto. Light source 38 generates light and directs it through polarizer 42a, liquid crystal display 44, and second polarizer 42b to provide actively illuminated images rendered by flat panel display 20.

A translucent diffuser 46 is positioned between panel 36 and back plate 40 to uniformly diffuse light from light source 38. Diffuser 46 may include a film or sheet of material or an etched or printed pattern of variable size or density to compensate for light source 38 being positioned on one side of panel 36, as is known in the art. An anti-reflection coating 48, such as HEA 2000 from Optical Coating Laboratories, Inc. of Santa Rosa, Calif., covers a surface of liquid crystal display 44 to prevent spurious reflections between it and polarizer 42a. Such an anti-reflection coating is formed on a birefringent polyester base with a stretch axis that is aligned parallel to a transmission axis of polarizer 42a to avoid undesirable polarization changes in the light.

Figure 6:
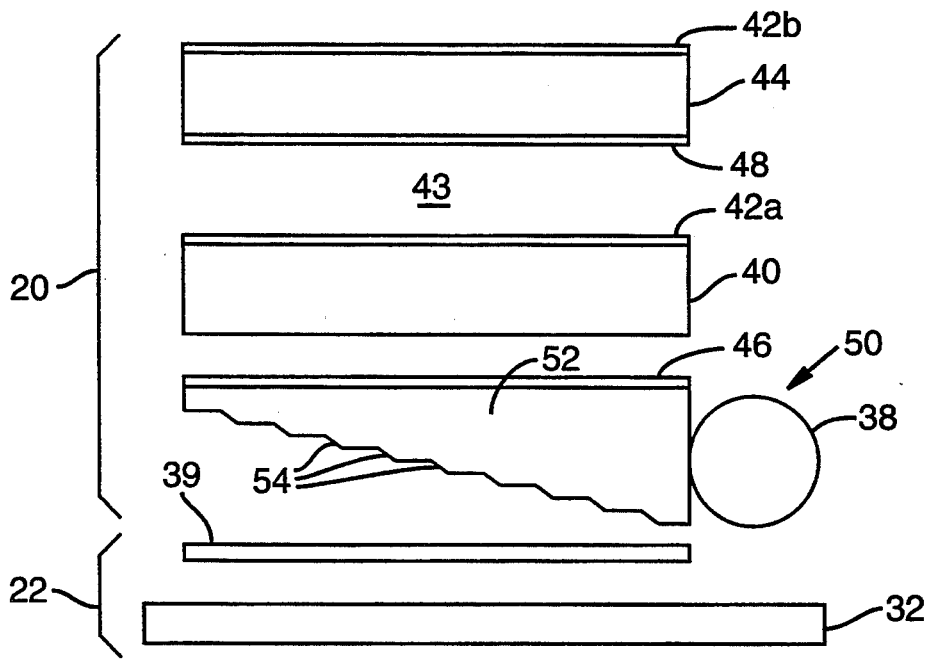
FIG. 6 is a diagrammatic side view of optical components in a second preferred flat panel display incorporated in the in the information processing device of FIG. 1.

FIG. 6 is a diagrammatic side view of second preferred optical components in flat panel display 20 and backing member 22, which components are the same and bear common reference numerals as those of FIG. 5, except as follows. A backlight unit 50 having a transparent wedge-type panel 52 is included in flat panel display 20 and illuminates it when fluorescent light source 38 is on and is transparent when light source 38 is off. Wedge-type panel 52 is of the type described in U.S. Pat. No. 5,050,946 of Hathaway et al. and includes multiple successive facets 54 oriented to reflect light from light source 38 whenever it is on or to allow light to pass therethrough whenever case backing 32 is removed.

Referring also to FIG. 7, backing member 22 may be secured to display panel section 18 by a fastener having, for example, any combination of complementary tongues 56 and grooves 58, together with at least one user-operable latch 60 (two shown). An electrical connection between one of tongues 56 and grooves 58 could deliver power from base section 12 to light source 38 in the embodiment of FIG. 5. When backing member 22 is removed from display panel section 18, information processing device 10 may be configured for use as a projection display panel operable with an overhead projector 70.

Figure 4B:
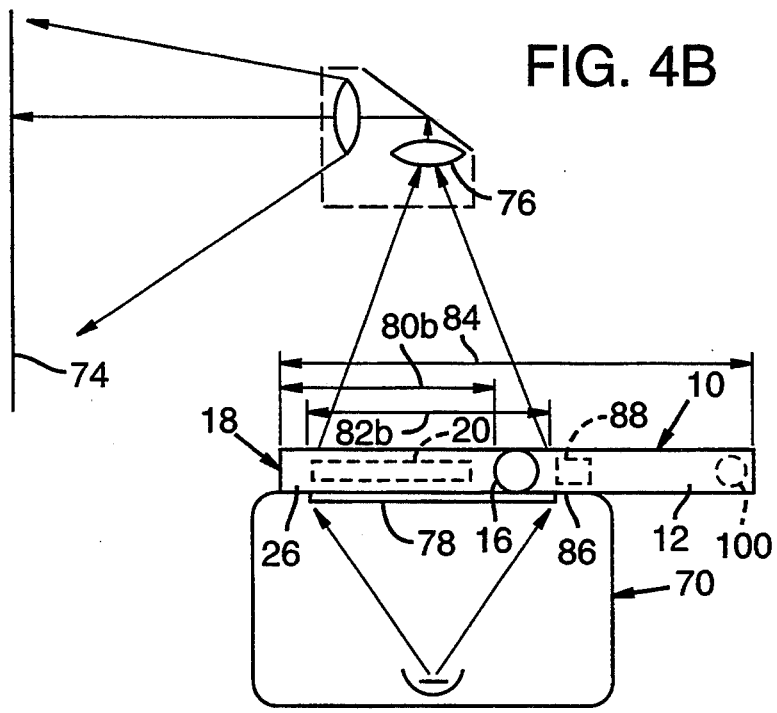

FIGS. 4A and 4B are diagrammatic front and side views showing the operation of information processing device 10 with a conventional overhead projector 70 to display computer-generated or other video information on a projection screen 74. Overhead projector 70 includes a projection lens assembly 76 that projects onto projection screen 74 light received from a platen 78. The light transmitted from platen 78 passes through flat display panel 20 to projection screen 74. Flat panel display 20 modifies the light generated by overhead projector 70 to form a computer-generated or other video image on projection screen 74.

Annular case element 26 has a width 80a and a length 80b that are, respectively, greater and less than the corresponding width 82a and length 82b of platen 78. When information processing device 10 is configured as a projection display panel, display panel section 18 is generally nonoverlapping and co-planar with base section 12, thereby providing information processing device 10 with a length 84 that is greater than length 82b of platen 78. As a result, base section 12 functions as an extendable extension panel that blocks undesirable light that would otherwise propagate past display panel section 18 to projection screen 74.

With a configuration as a conventional laptop-style personal computer, information processing device 10 would typically have a length 84 that is greater than platen 78 as well as the main surface 86 of overhead projector 70. When information processing device 10 is configured as a projection display panel, therefore, a portion of base section 12 would typically extend beyond main surface 86.

To properly balance information processing device 10 on main surface 86, relatively heavy components in information processing device 10 are positioned adjacent pivotal coupling 16. Examples of such heavy components include a power supply unit 88, which may include a battery pack for stand-alone operation or a power converter, and disk drive unit 90 (FIG. 1, two shown), which may include floppy- and hard-disk drives for storing information.

Figure 8:
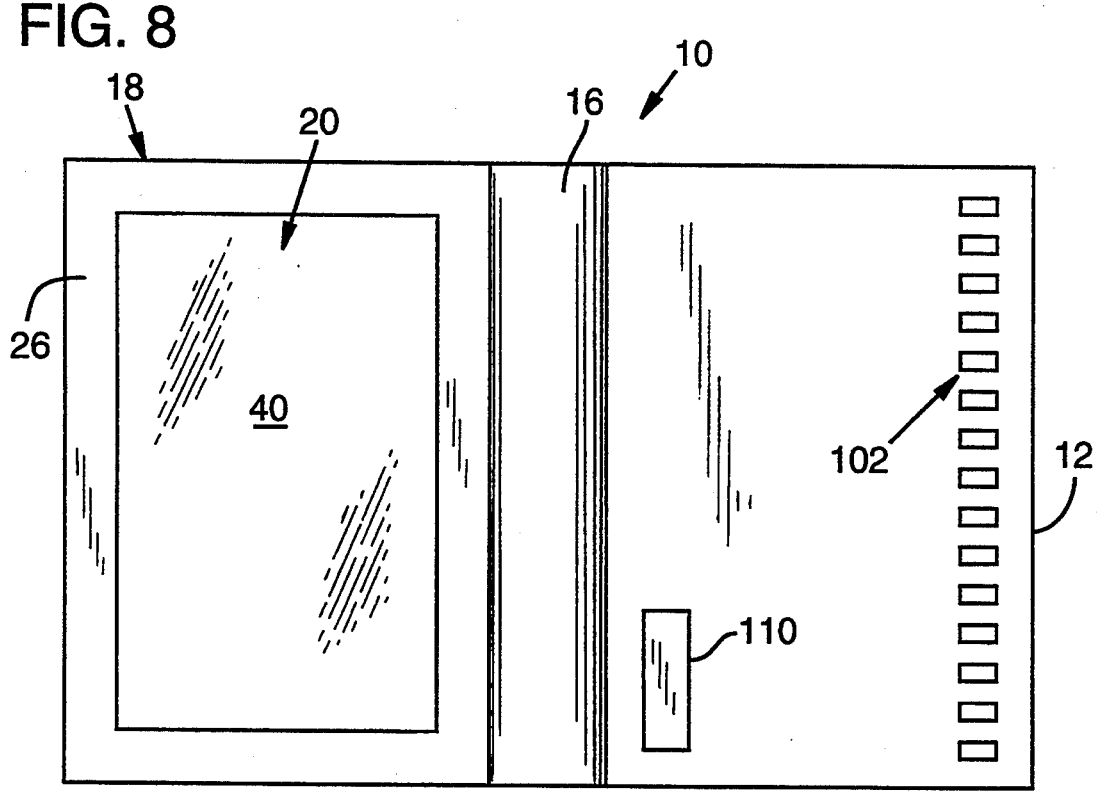
FIG. 8 is a bottom plan view of the information processing device of FIGS. 4A and 4B.

Referring also to FIG. 8, an elongated "squirrel-cage" fan 100 is positioned along an end margin of base section 12 opposite pivotal coupling 16. Fan 100 draws ambient air through an intake grill 102 and passes the air along flat panel display 20, toward the computer circuitry, and out an exhaust grill 104 (FIG. 2). The moving air passes along and cools flat panel display 20 and the computer circuitry. In particular, fan 100 passes air in space 43 between polarizer 42a and liquid crystal display 44.

A liquid crystal display typically includes polarizers positioned in contact therewith. However, polarizers can absorb from platen 78 significant amounts of heat that can degrade the performance and durability a liquid crystal display in contact with the polarizers. Accordingly, cooling of liquid crystal display 44 is improved by positioning polarizer 42a in spaced-apart relation thereto to prevent heat it absorbs from being delivered to liquid crystal display 44.

Typically, fan 100 would be powered by the main power source for information processing device 10, such as a battery pack. However, fan 100 would typically consume a disproportionate amount of power available from a battery source, thereby reducing the operating time of information processing device 10. To prevent such operating limitations, information processing device 10 includes a photo-active (e.g., photo-voltaic) device 110 (FIG. 8) positioned to receive light from a bottom surface 112 of information processing device 10.

Photo-active device 110 is activated by a control switch (not shown) that is automatically controlled by the presence or absence of backing member 22. For example, one of tongues 56 could engage the control switch whenever backing member 22 is secured to display panel section 18. Whenever backing member 22 is removed from display panel section 18, the control switch allows photo-active device 110 to drive fan 100 with power photo-active device 110 generates from light received from platen 78. Whenever backing member 22 is in display panel section 18, the control switch disengages photo-active device 110 because fan 100 is unneeded when information processing device 10 is configured to operate as a laptop-style personal computer.

In addition to activating photo-active device 110, the control switch also activates a contrast correction signal that improves contrast uniformity of images projected onto projection screen 74. In flat panel displays for conventional laptop-style personal computers, image contrast is relatively uniform through a substantial range of horizontal viewing angles but only a relatively small range of vertical viewing angles.

Figure 9:
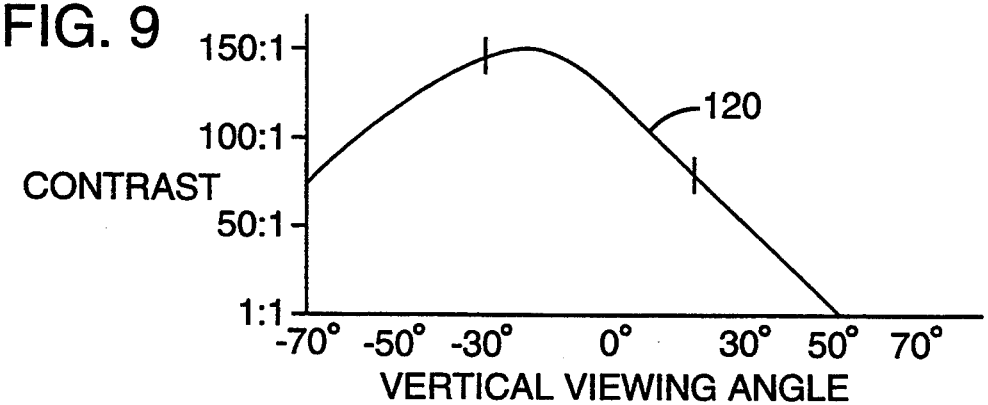
FIG. 9 is a graphical representation of image contrast versus vertical viewing angle characteristic of an exemplary conventional liquid crystal display.

FIG. 9 is a graph showing image contrast versus vertical viewing angle for an exemplary thin-film transistor-driven twisted nematic liquid crystal display with a 6:00 preferred viewing direction. The vertical viewing angles are measured relative to an axis that is perpendicular to the liquid crystal display. Such a flat panel display in a projection display panel suffers from discernible image contrast variations represented by a range 120 of about 45° between vertical viewing angles of −25° and +20°, which represent the respective top and bottom of a projected image.

Accordingly, whenever backing member 22 is removed from display panel section 18, a control switch as described above activates in the computer circuitry a contrast correction signal that is applied to flat panel display 20, in which pixels are arranged in multiple successive horizontal rows. The contrast correction signal includes correction voltages that are applied to each horizontal row in addition to any signal used to address the row.

Figure 10:
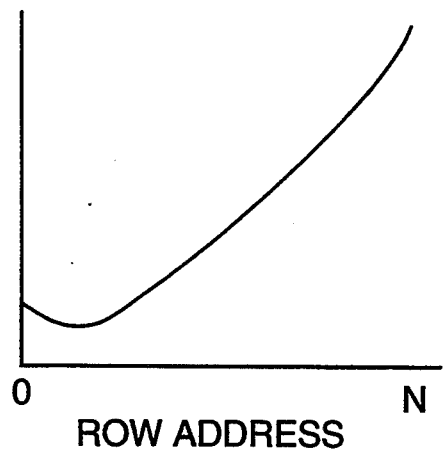
FIG. 10 is a graphical representation of relative correction voltage versus horizontal row address for correcting contrast variations characteristic of an exemplary conventional liquid crystal display.

FIG. 10 is a graph showing relative correction voltages versus horizontal row address, in which row addresses O and N correspond to the respective top and bottom rows of a projected image. The variable N represents an integer value corresponding to the number of rows in the display. The correction voltages may range between, for example, 2 and 5 volts. The correction voltages represent an inverse of the graph of FIG. 8 over region 120 to provide uniform contrast over a projected display image. The correction voltages may be generated from corresponding digital values stored in nonvolatile memory and retrieved therefrom in coordination with the addressing of display 20, as is known in the art.

Referring to FIG. 11, base section 12 further includes a cradle or receptacle 130 for supporting data input keys 14, which are removable from receptacle 130 to function as a remote control unit 132 that delivers input information to and controls information processing device 10 when it is configured to operate as a projection display panel. For example, remote control unit 132 directs infrared light signals to a photoreceptor input 134 for controlling various display characteristics such as, for example, switching information processing device 10 on and off, changing between different display images, moving a cursor, or changing image brightness, as described in U.S. Pat. No. 5,101,197 of Hix et al. for Electronic Transparency Method and Apparatus. Remote control unit 132 may include all (as shown) or any subset of data input keys 14.

It will be appreciated that remote control unit 132 together with a battery pack 88, the latter of which is commonly available in laptop-style personal computers, allows information processing device 10 to be operable as a wireless projection display panel. Remote control unit 132, whether all or only a portion of data input keys 14, is a light-weight device that provides a user with convenient remote operation of information processing device 10. Moreover, bandwidth requirements for transmitting keystroke information from remote control unit 132 to information processing device 10 by conventional infrared modulation techniques are easily achievable.

Preferably, all data input keys 14 communicate with information processing device 10 by the conventional infrared modulation techniques so that only one interface is needed between remote control unit 132 and information processing device 10. To avoid duplication of photoreceptor input 134 and its associated circuitry, receptacle 130 includes a window 136 positioned to receive infrared light generated by remote control unit 132 when it is in receptacle 130. A multimode fiber optic cable 138 (shown in outline) is positioned within base section 12 with one end 140 facing window 136 and the other end 142 facing photoreceptor input 134. As a result, data input keys 14 communicate with information processing device 10 via a single photoreceptor input 134, whether operated remotely or within receptacle 130.

Prior multipurpose projectable displays provide significantly less convenient operation. For example, U.S. Pat. No. 5,041,965 of Chen describes a laptop computer with a detachable display for use with an overhead projector. In such an operating mode, a user must handle the comparatively heavy main computer body of the personal computer. Moreover, transmission of all display data from the main computer body to the detached display requires a cable connection to meet the data bandwidth requirements. Such a connection is restrictive in comparison to the wireless remote operation provided by the present invention.

Annular case element 26 of display panel section 18 and a case element for base section 12 may be constructed or formed in any conventional manner such as, for example, with respective mated pairs of injection-molded plastic components joined by screws or snap clips (not shown). It will be appreciated, however, that the construction of and manner of engaging annular case element 26 and the case element for base section 12 may vary significantly from the preferred embodiment while still providing the benefits of the present invention.

Figure 12:
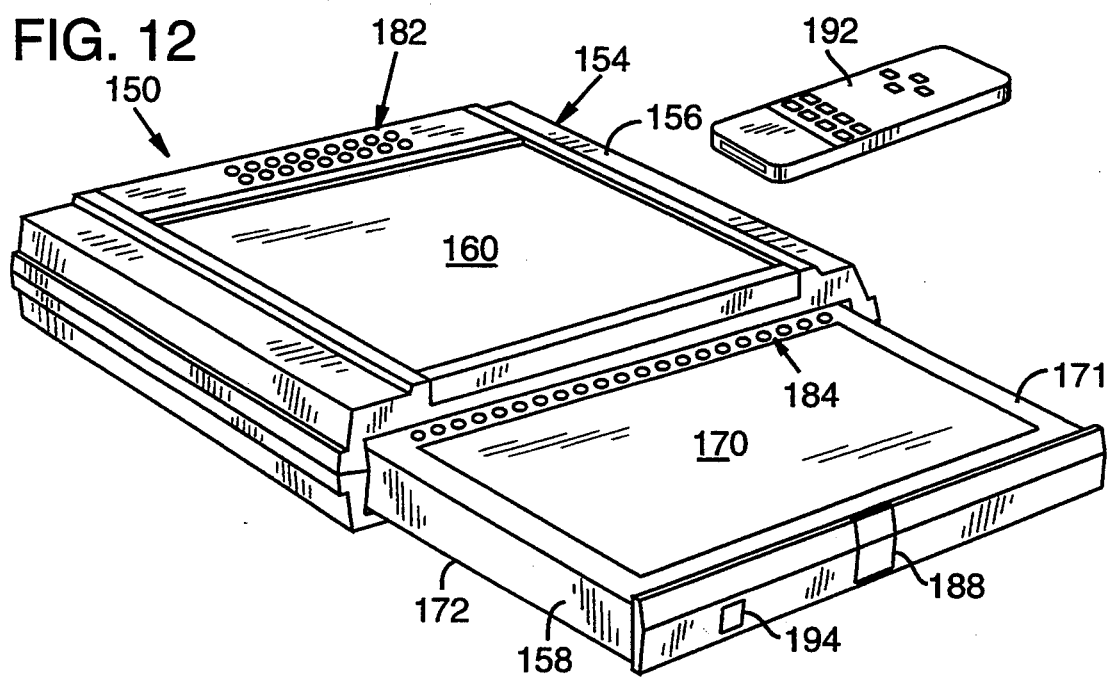
FIG. 12 is a perspective view of an alternative information processing device of the present invention configured for use as an overhead projection display panel employing a case with an extended extension panel configured as a drawer.
Figure 13:
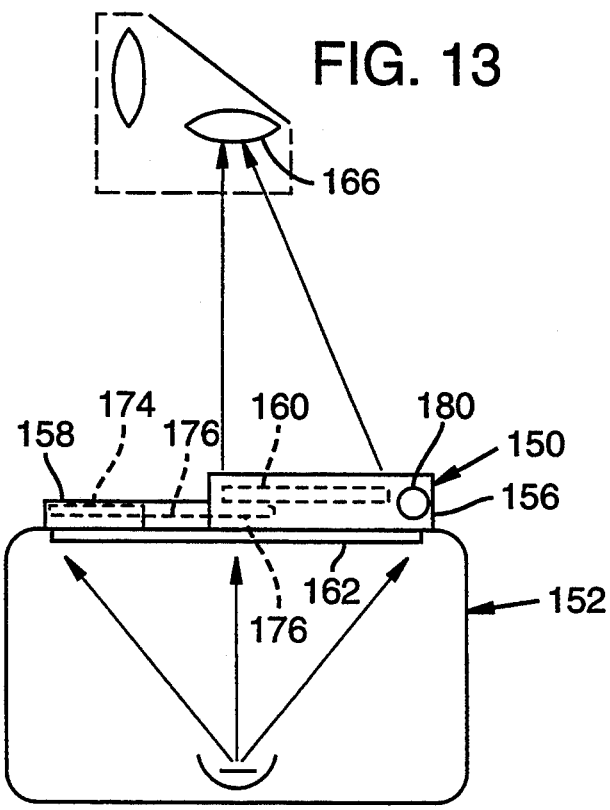
FIG. 13 is a diagrammatic side view of the overhead projection display panel of FIG. 12 positioned with an overhead projector light source.
Figure 14:
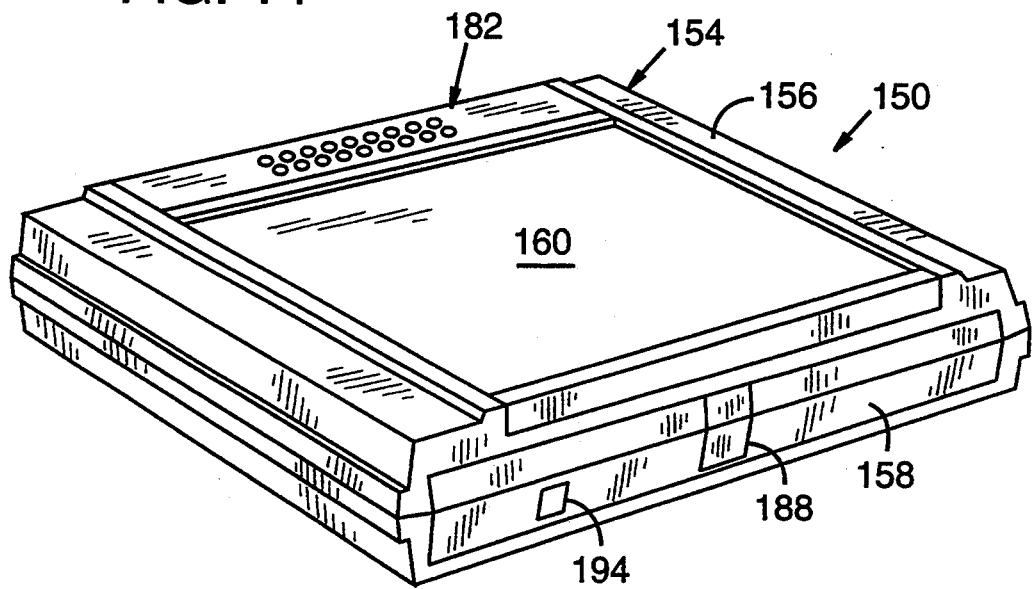
FIG. 14 is a perspective diagram of the display panel of FIG. 12 with the extension panel retracted.

FIGS. 12 and 13 show respective perspective and diagrammatic side views of an alternative information processing device 150 configured as an overhead projection display panel that operates with a conventional overhead projector light source 152 to display computer-generated information on a projection screen (not shown) in the manner described above with reference to information processing device 10 as shown in FIGS. 4A and 4B. Display panel 150 includes a case 154 having an annular case element 156 and an extension panel 158 longitudinally extendable from annular case element 156. Extension panel 158 is shown in its extended position in FIGS. 12 and 13 and in its retracted position in FIG. 14.

Annular case element 156 supports a light modulating element 160 such as, for example, a liquid crystal device of the type described in U.S. Pat. No. 4,917,465 of Conner et al. Light modulating element 160 is supported by its side margins so that light emitted from a platen 162 of overhead projector 152 passes through light modulating element 160 toward the projection screen via a projection lens assembly 166.

Extension panel 158 supports a backlight unit 170, such as a Model No. TB2607A from Hitachi of Tokyo, Japan, on a top surface 171. With extension panel 158 in its retracted position, backlight unit 170 is positioned behind and capable of illuminating light modulating element 160 for direct viewing. In addition, extension panel 158 includes a bottom surface 172 that is opaque (e.g., plastic case material). In its retracted position, therefore, extension panel 158 prevents transmissive viewing of light modulating element 160.

Preferably, extension panel 158 encases modulation control circuitry 174 that controls operation of light modulating element 160. Modulation control circuitry 174 communicates with light modulating element 160 via a flexible circuit coupling 176 that is looped between modulation control circuitry 174 and light modulating element 160. An elongated "squirrel-cage" fan 180 is positioned along an end margin of annular case element 156 opposite extension panel 158. Fan 180 draws ambient air through an intake grill 182 and passes the air along light modulating element 160, toward modulation control circuitry 174, and out an exhaust grill 184. The cooling air passes along and cools light modulating element 160 and modulation control circuitry 174.

Extension panel 158 includes a latch 188 for securing extension panel 158 in its retracted position and a remote control unit 192 that controls various display characteristics of display panel 150. For example, remote control unit 192 can direct infrared light signals to a photoreceptor input 194 for controlling various display characteristics such as, for example, switching display panel 150 on and off, changing between different display images, moving a cursor, or changing image brightness, as described in U.S. Pat. No. 5,101,197 of Hix et al. for Electronic Transparency Method and Apparatus. Extension panel 158 also supports sockets (not shown) for delivering power and display data to display panel 150.

It will be obvious to those having skill in the art that many changes may be made in the above-described details of the preferred embodiments of the present invention without departing from the underlying principles thereof. The scope of the invention should, therefore, be determined only by the following claims.

We claim:

1. In an information processing device of a unitary configuration having a base section that contains computer circuitry, supports data input keys, and is pivotally coupled to a display panel section with an addressable flat panel display and an opaque backing member in opposed face-to-face relation, the display panel section being selectively positionable between a first position in which the flat panel display is directly observable by a user and a second position in which the backing member covers the flat panel display and the data input keys, the improvement comprising:

the pivotal coupling between the base section and the panel display section allowing the latter to pivot to a third position that is generally nonoverlapping and co-planar with the base section;

a user-operable fastener between the backing member and the panel display section so that the backing member is removable from the panel display section to allow transmissive observation of the flat panel display; and a light-generating unit included in the display panel section for generating light between the backing member and the flat panel display for direct viewing of it, the light-generating unit being coupled to the backing member to be removable with it from the display panel section.

2. The device of claim 1 in which the flat panel display includes an addressable electro-optical element and an associated polarizer in face-to-face relation, the polarizer being positioned between the backing member and the addressable electro-optical element and in spaced-apart relation to the addressable electro-optical element.

3. The device of claim 2 in which the addressable electro-optical element includes a liquid crystal display.

4. The device of claim 1 in which the computer circuitry includes nonvolatile memory that stores operating instructions for operating the device as a personal computer.

5. The device of claim 4 in which the nonvolatile memory further stores operating instructions for operating the device as a projection display panel.

6. The device of claim 1 in which the computer circuitry includes nonvolatile memory that stores operating instructions for operating the device as a projection display panel.

7. The device of claim 1 further comprising an energy storage unit that provides energy for operating the device, the energy storage unit being positioned within the base section adjacent the pivotable coupling.

8. The device of claim 1 further comprising a remote control unit for controlling the device remotely.

9. An information processing device with a convertible display system, comprising:

a base section that contains computer circuitry and supports data input keys, the computer circuitry including nonvolatile memory that stores operating instructions for selectively operating the device as a personal computer and a projection display panel;

a display panel section having an addressable flat panel display and an opaque backing member in opposed face-to-face relation;

a pivotal coupling between the base section and the panel display section that allows the latter to pivot between a first position in which the flat panel display is directly observable by a user, a second position in which the backing member covers the flat panel display and the data input keys, and a third position that is generally nonoverlapping and co-planar with the base section;

a user-operable fastener between the backing member and the panel display section so that the backing member is removable from the panel display section to allow transmissive observation of the flat panel display; and a light-generating unit included in the display panel section for generating light between the backing member and the flat panel display for direct viewing of it, the light-generating unit being coupled to the backing member to be removable with it from the display panel section.

10. The device of claim 9 in which the flat panel display includes an addressable electro-optical element and an associated polarizer in face-to-face relation, the polarizer being positioned between the backing member and the addressable electro-optical element and in spaced-apart relation to the addressable electro-optical element.

11. The device of claim 9 further comprising an energy storage unit that provides energy for operating the device, the energy storage unit being positioned within the base section adjacent the pivotable coupling.

12. The device of claim 9 further comprising a remote control unit for controlling the device remotely.

13. In an information processing device having a light modulating element for modulating light to display information and modulation control circuitry for controlling the light modulating element, the device being operable with an overhead projector to form projection display images, the improvement comprising:

an annular case element with an aperture within which the light modulating element is supported;

an opaque panel connected and longitudinally extendable relative to the annular case element and selectively positionable in first and second positions to, respectively, occlude and not occlude the light modulating element, at least one of the annular case element and the extension panel encasing modulation control circuitry of the display panel; and a light source that is positioned between the opaque panel and the light modulating element to illuminate the light modulating element when the opaque panel is in the first position, the opaque panel being in the second position when the information processing device is operated with an overhead projector to form projection display images.

14. The device of claim 13 in which the opaque panel encases the modulation control circuitry.

15. In an information processing device of a unitary configuration having a base section that contains computer circuitry, supports data input keys, and is pivotally coupled to a display panel section with an addressable flat panel display and an opaque backing member in opposed face-to-face relation, the display panel section being selectively positionable between a first position in which the flat panel display is directly observable by a user and a second position in which the backing member covers the flat panel display and the data input keys, the improvement comprising:

the pivotal coupling between the base section and the panel display section allowing the latter to pivot to a third position that is generally nonoverlapping and co-planar with the base section;

a user-operable fastener between the backing member and the panel display section so that the backing member is removable from the panel display section to allow transmissive observation of the flat panel display; and a light-generating unit included in the display panel section for generating light between the backing member and the flat panel display for direct viewing of it, the light-generating unit being coupled to the flat panel display, the backing member being separately removable from the display panel section, and the light-generating unit being transmissive to allow transmissive observation of the flat panel display.

16. The device of claim 15 in which the flat panel display includes an addressable electro-optical element and an associated polarizer in face-to-face relation, the polarizer being positioned between the backing member and the addressable electro-optical element and in spaced-apart relation to the addressable electro-optical element.

17. The device of claim 16 in which the addressable electro-optical element includes a liquid crystal display.

18. The device of claim 15 in which the computer circuitry includes nonvolatile memory that stores operating instructions for operating the device as a personal computer.

19. The device of claim 18 in which the nonvolatile memory further stores operating instructions for operating the device as a projection display panel.

20. The device of claim 15 in which the computer circuitry includes nonvolatile memory that stores operating instructions for operating the device as a projection display panel.

21. The device of claim 15 further comprising an energy storage unit that provides energy for operating the device, the energy storage unit being positioned within the base section adjacent the pivotable coupling.

22. The device of claim 15 further comprising a remote control unit for controlling the device remotely.

23. In an information processing device of a unitary configuration having a base section that contains computer circuitry, supports data input keys, and is pivotally coupled to a display panel section with an addressable flat panel display and an opaque backing member in opposed face-to-face relation, the display panel section being selectively positionable between a first position in which the flat panel display is directly observable by a user and a second position in which the backing member covers the flat panel display and the data input keys, the improvement comprising:
the pivotal coupling between the base section and the panel display section allowing the latter to pivot to a third position that is generally nonoverlapping and co-planar with the base section;
a user-operable fastener between the backing member and the panel display section so that the backing member is removable from the panel display section to allow transmissive observation of the flat panel display; and
an addressable electro-optical element and an associated polarizer in face-to-face relation included in the flat panel display, the polarizer being positioned between the backing member and the addressable electro-optical element and in spaced-apart relation to the addressable electro-optical element.

24. The device of claim 23 in which the addressable electro-optical element includes a liquid crystal display.

25. In an information processing device of a unitary configuration having a base section that contains computer circuitry, supports data input keys, and is pivotally coupled to a display panel section with an addressable flat panel display and an opaque backing member in opposed face-to-face relation, the display panel section being selectively positionable between a first position in which the flat panel display is directly observable by a user and a second position in which the backing member covers the flat panel display and the data input keys, the improvement comprising:
the pivotal coupling between the base section and the panel display section allowing the latter to pivot to a third position that is generally nonoverlapping and co-planar with the base section;
a user-operable fastener between the backing member and the panel display section so that the backing member is removable from the panel display section to allow transmissive observation of the flat panel display; and
a cooling fan positioned within the base section and a photo-active power source for powering the cooling fan.

26. The device of claim 25 in which the base section includes a bottom surface for supporting the device and the photo-active power source is positioned to receive light from the bottom surface.

27. The device of claim 25 further comprising a cooling fan control switch positioned to be automatically switched by removal of the backing member from the display panel section for activating the photo-active power source when the backing member is removed.

28. An information processing device with a convertible display system, comprising:
a base section that contains computer circuitry and supports data input keys, the computer circuitry including nonvolatile memory that stores operating instructions for selectively operating the device as a personal computer and a projection display panel;
a display panel section having an addressable flat panel display and an opaque backing member in opposed face-to-face relation;
a pivotal coupling between the base section and the panel display section that allows the latter to pivot between a first position in which the flat panel display is directly observable by a user, a second position in which the backing member covers the flat panel display and the data input keys, and a third position that is generally nonoverlapping and co-planar with the base section;
a user-operable fastener between the backing member and the panel display section so that the backing member is removable from the panel display section to allow transmissive observation of the flat panel display; and
a light-generating unit included in the display panel section for generating light between the backing member and the flat panel display for direct viewing of it, the light-generating unit being coupled to the flat panel display the backing member being separately removable from the display panel section, and the light-generating unit being transmissive to allow transmissive observation of the flat panel display.

29. The device of claim 28 in which the flat panel display includes an addressable electro-optical element and an associated polarizer in face-to-face relation, the polarizer being positioned between the backing member and the addressable electro-optical element and in spaced-apart relation to the addressable electro-optical element.

30. The device of claim 28 further comprising an energy storage unit that provides energy for operating the device, the energy storage unit being positioned within the base section adjacent the pivotable coupling.

31. The device of claim 28 further comprising a remote control unit for controlling the device remotely.

32. An information processing device with a convertible display system, comprising:

a base section that contains computer circuitry and supports data input keys, the computer circuitry including nonvolatile memory that stores operating instructions for selectively operating the device as a personal computer and a projection display panel;

a display panel section having an addressable flat panel display and an opaque backing member in opposed face-to-face relation;

a pivotal coupling between the base section and the panel display section that allows the latter to pivot between a first position in which the flat panel display is directly observable by a user, a second position in which the backing member covers the flat panel display and the data input keys, and a third position that is generally nonoverlapping and co-planar with the base section;

a user-operable fastener between the backing member and the panel display section so that the backing member is removable from the panel display section to allow transmissive observation of the flat panel display; and a cooling fan positioned within the base section and a photo-active power source for powering the cooling fan.

33. In an information processing device having a light modulating element for modulating light to display information and modulation control circuitry for controlling the light modulating element, the device being operable with an overhead projector to form projection display images, the improvement comprising:

an annular case element with an aperture within which the light modulating element is supported;

an opaque panel connected and pivotable relative to the annular case element and selectively positionable in first and second positions to, respectively, occlude and not occlude the light modulating element, at least one of the annular case element and the extension panel encasing modulation control circuitry of the display panel; and a light source that is positioned between the opaque panel and the light modulating element to illuminate the light modulating element when the opaque panel is in the first position, the opaque panel being in the second position when the information processing device is operated with an overhead projector to form projection display images.

34. The device of claim 33 in which the opaque panel encases the modulation control circuitry.

35. In an information processing device having a light modulating element for modulating light to display information and modulation control circuitry for controlling the light modulating element, the light modulating element having first and second opposed major surfaces, the device being operable with an overhead projector to receive light at the first major surface and pass light from the second major surface to form projection display images, the improvement comprising:

an annular case element with an aperture within which the light modulating element is supported; and a removable backing member positionable in opposed face-to-face relation to the first major surface of the light modulating element and having light directing means for directing light through the light modulating element to allow direct viewing of it.

36. The device of claim 35 in which the light directing means includes a reflective material facing the first major surface for receiving and reflecting through the light modulating element ambient light that strikes the second major surface and propagates to the reflective material.

37. The device of claim 35 in which the light directing means includes a backlight for generating and directing light through the light modulating element.

* * * * *